E. C. OSGOOD.
CORN CUTTING MACHINE.
APPLICATION FILED MAR. 12, 1918.

1,408,135.

Patented Feb. 28, 1922.
7 SHEETS—SHEET 1

E. C. OSGOOD.
CORN CUTTING MACHINE.
APPLICATION FILED MAR. 12, 1918.
1,408,135.
Patented Feb. 28, 1922.
7 SHEETS—SHEET 2.
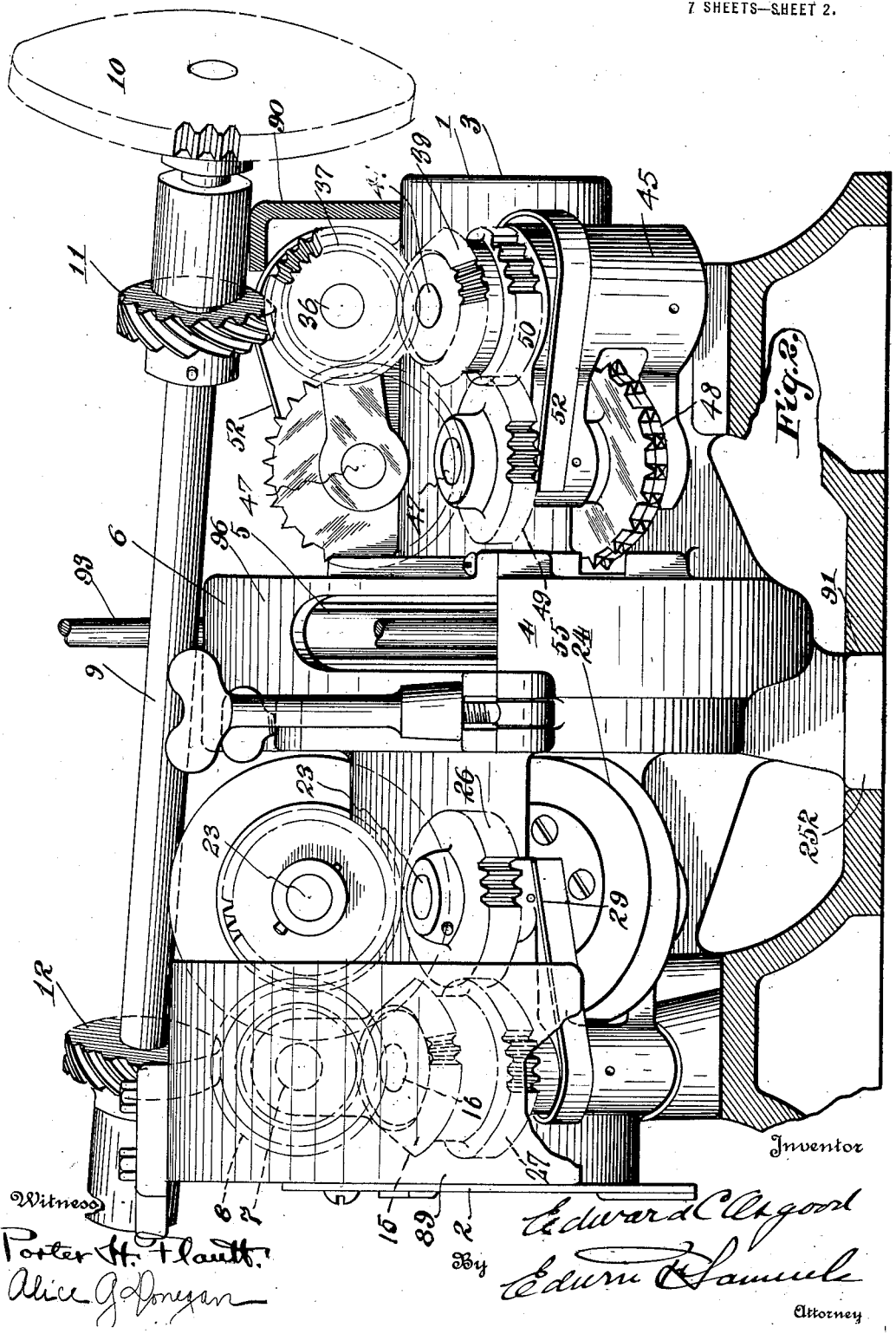

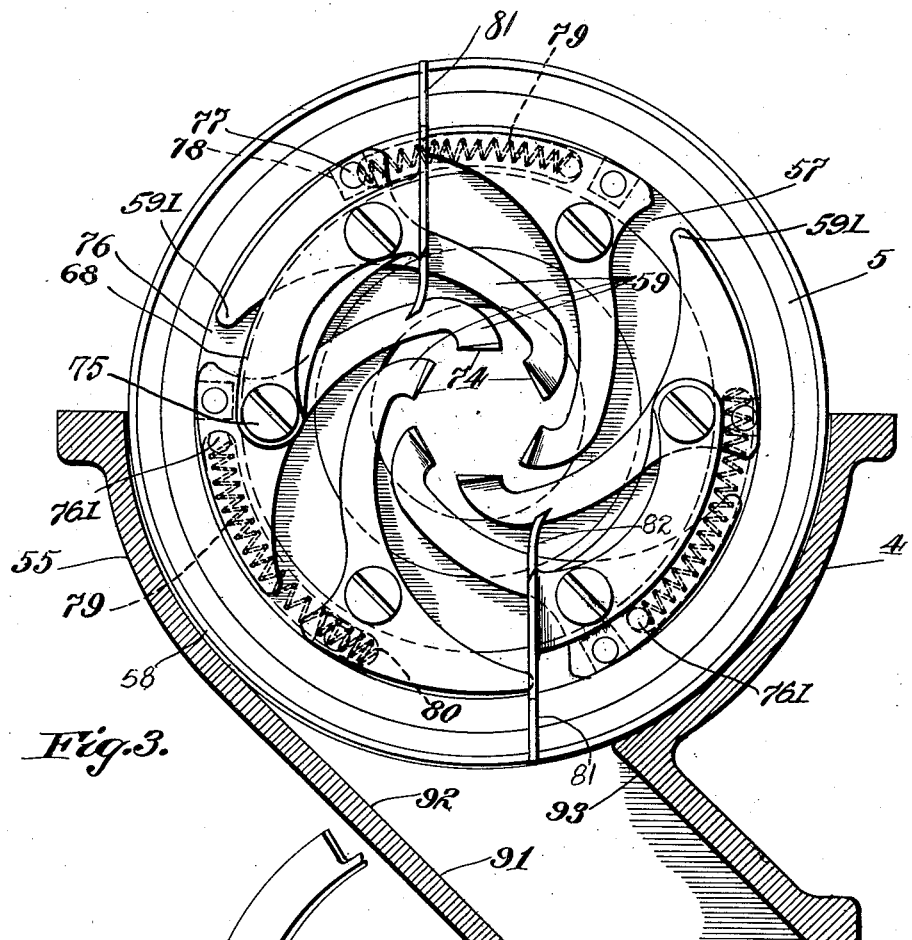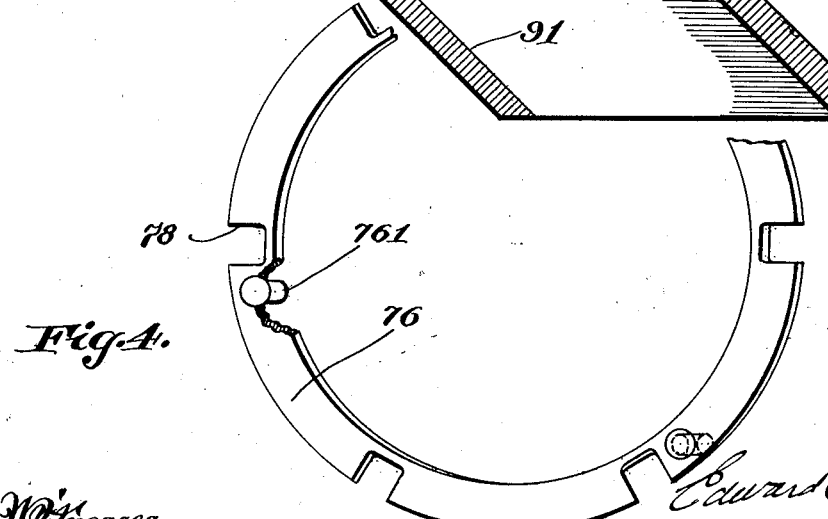

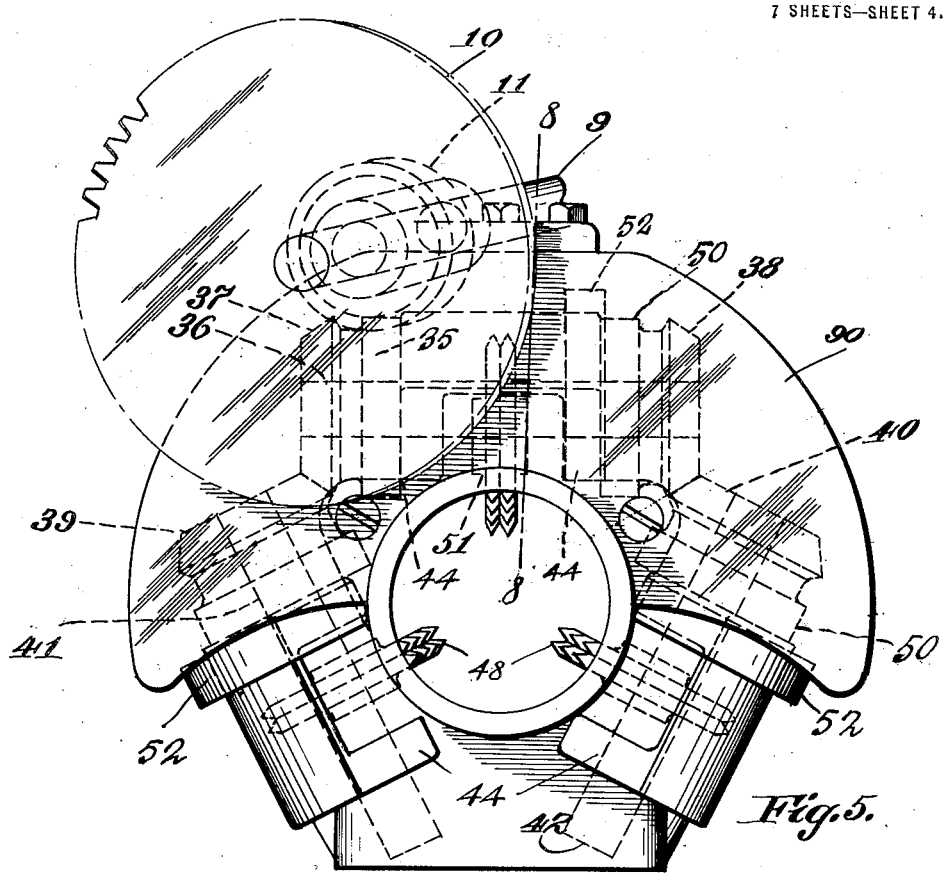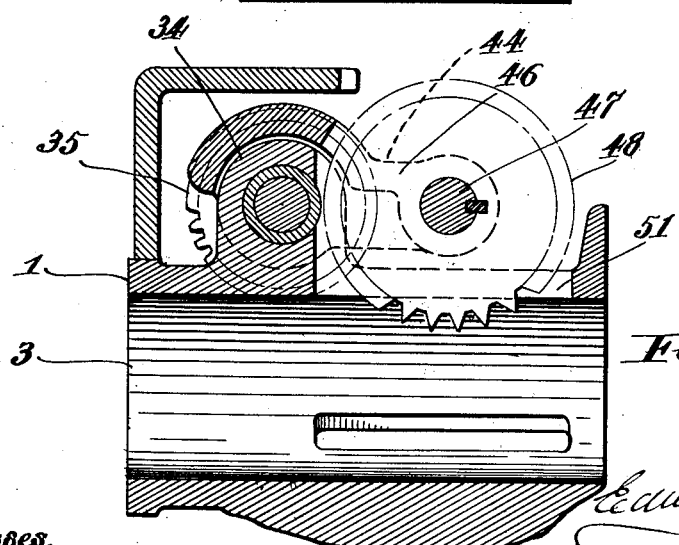

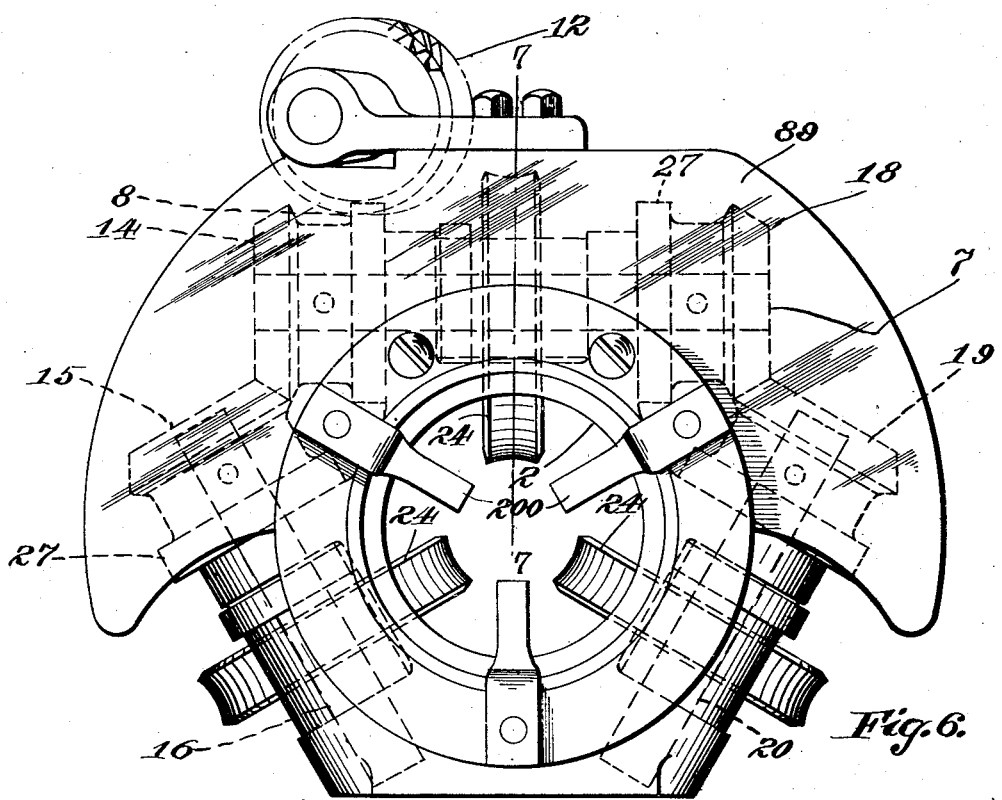
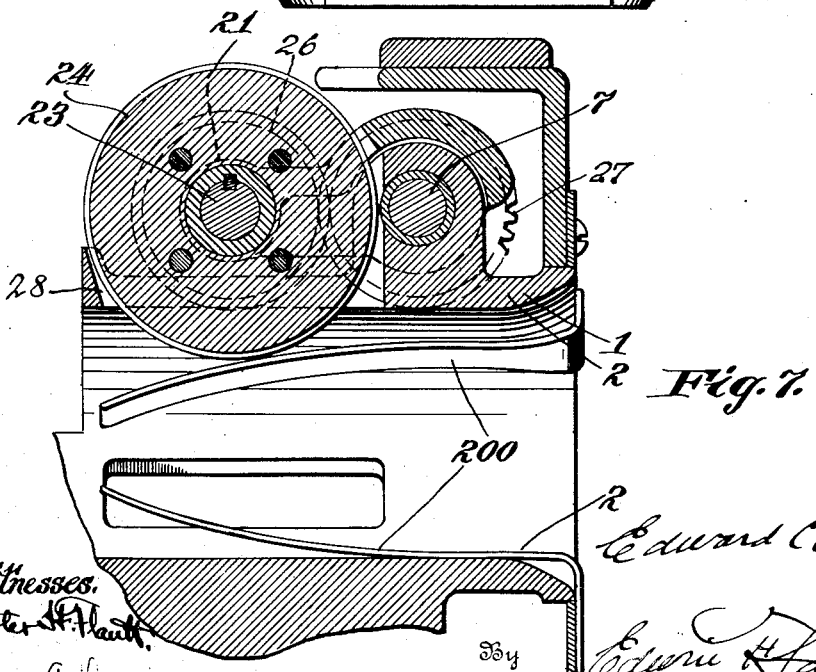

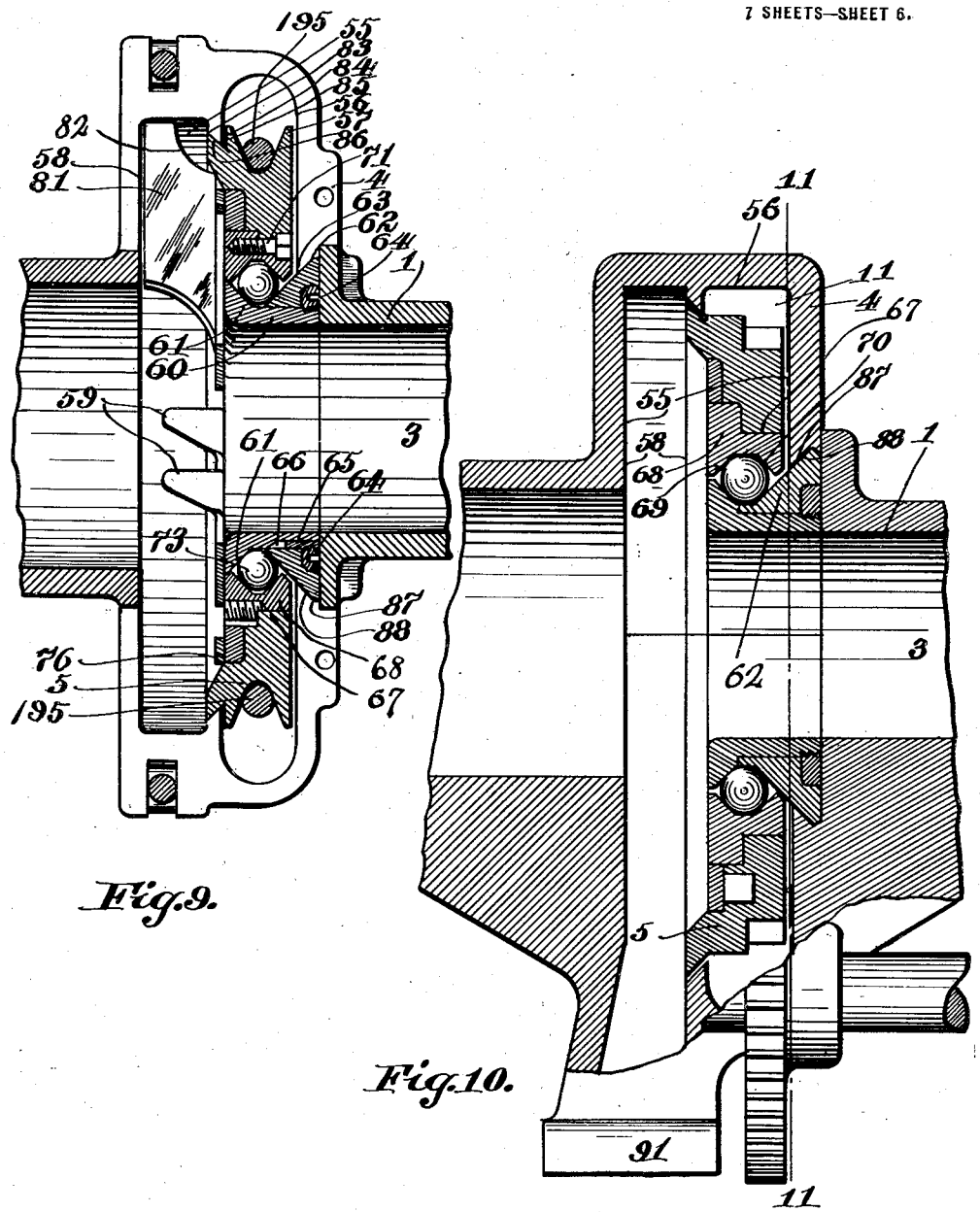

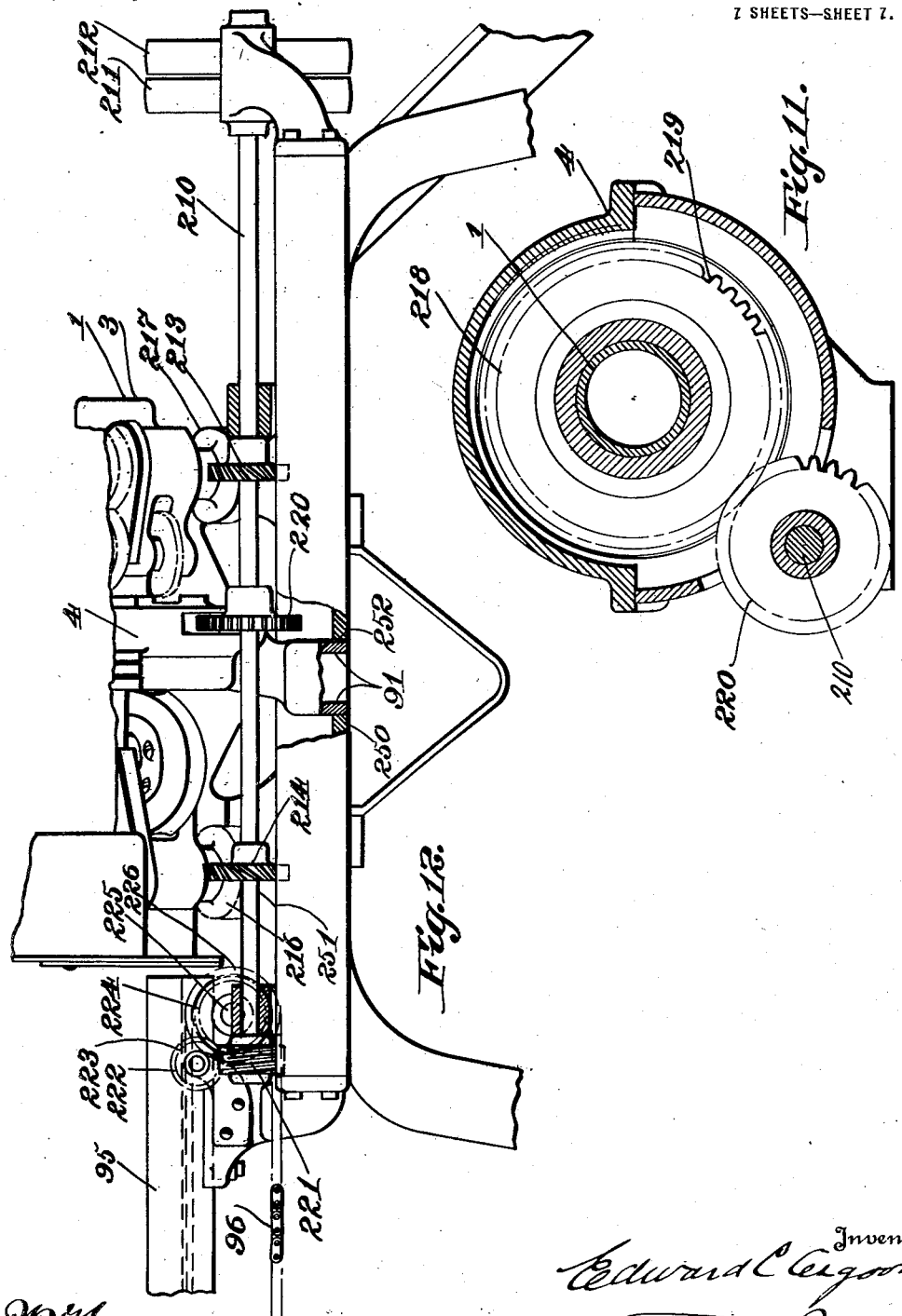

UNITED STATES PATENT OFFICE.

EDWARD C. OSGOOD, OF ABERDEEN, MARYLAND.

CORN-CUTTING MACHINE.

1,408,135.　　　　　Specification of Letters Patent.　　Patented Feb. 28, 1922.

Application filed March 12, 1918. Serial No. 221,968.

*To all whom it may concern:*

Be it known that I, EDWARD C. OSGOOD, a citizen of the United States of America, residing in Aberdeen, Harford County, Maryland, have invented certain new and useful Improvements in Corn-Cutting Machines, of which the following is a specification.

In canning corn, even in the large canneries, it is still customary to cut the grains from the cob by hand. This is done because in the best quality of canned corn, the grains must be intact. Also, in all the machines heretofore produced, the pulp and milk are permitted to accumulate on the parts. This accumulation soon becomes semi-putrid or fermented with the result that the fermentation is communicated to all the corn passing through the machine so that it sours almost immediately after cutting.

The present invention relates to a machine for cutting green corn from the cob in the production of canned green corn. Numerous so-called corn cutting machines have been developed and patented but the majority of these have as their purpose, or at least as their result, the production of mush corn. On the other hand, the present machine cuts the grains cleanly from the cob and delivers them whole, working as little destruction to the form of grains as if they were cut by hand.

Another feature of the machine relates to the complete enclosure of the rapidly rotating cutting apparatus which in combination with the scrapers revolving with the cutters, gives a blower action which tends to keep the parts clean and prevent the accumulation of pulp, milk and debris with the consequent fermentation. This blower action is aided by the central feed and delivery near the circumference of the casing so that no fermentation can take place in the machine when in normal operation.

In this connection, it should be understood that the casing is of uniform cross-section in its radial plane and the scrapers, fitting or conforming to this cross-section, serve to keep the casing clean by mechanical friction. These cleaning or scraping members rotating with the cutters also have the operation of a blower fan, the casing being similar to a blower casing and the blower action serves to deliver the material and eject it with a force and speed which absolutely prohibit accumulation of milk and pulp on the parts. In previous cutters there has been a considerable amount of waste due to the failure to cut the kernels close to the cob. In the present machine however, an important economy as compared to hand-cutting is observed due to the fact that the cutters are pivoted in such a manner as to give them a natural tendency to cut close to the cob without removing any of the cob itself.

In the accompanying drawings I have illustrated a cutting head or corn cutter embodying the various features of my invention. In the drawings:

Fig. 2 is a side elevation;

Fig. 3 is an elevation of the cutter carrier and cutters, the casing being cut away and the parts forward of the cutters removed for purposes of illustration;

Fig. 4 is a view of the cutter actuating ring;

Fig. 5 is an elevation looking at the cutter head from the direction of the delivery end;

Fig. 6 is a similar elevation looking into the machine from the opposite end;

Fig. 7 is a radial section on the line 7, 7 of Fig. 6 showing the mounting of the feed rollers, etc.

Fig. 8 is a similar section on the line 8, 8 Fig. 5, showing the cob delivery rollers;

Fig. 9 is a longitudinal fragmentary section showing the cutter carrier, cutters and bearings;

Fig. 10 is a similar view of a modified form;

Fig. 11 is a section on the line 11, 11 of Figure 10; and

Fig. 12 is a side elevation of the latter form, the upper parts being broken away as non-essential to the illustration of the modification.

Figure 1:
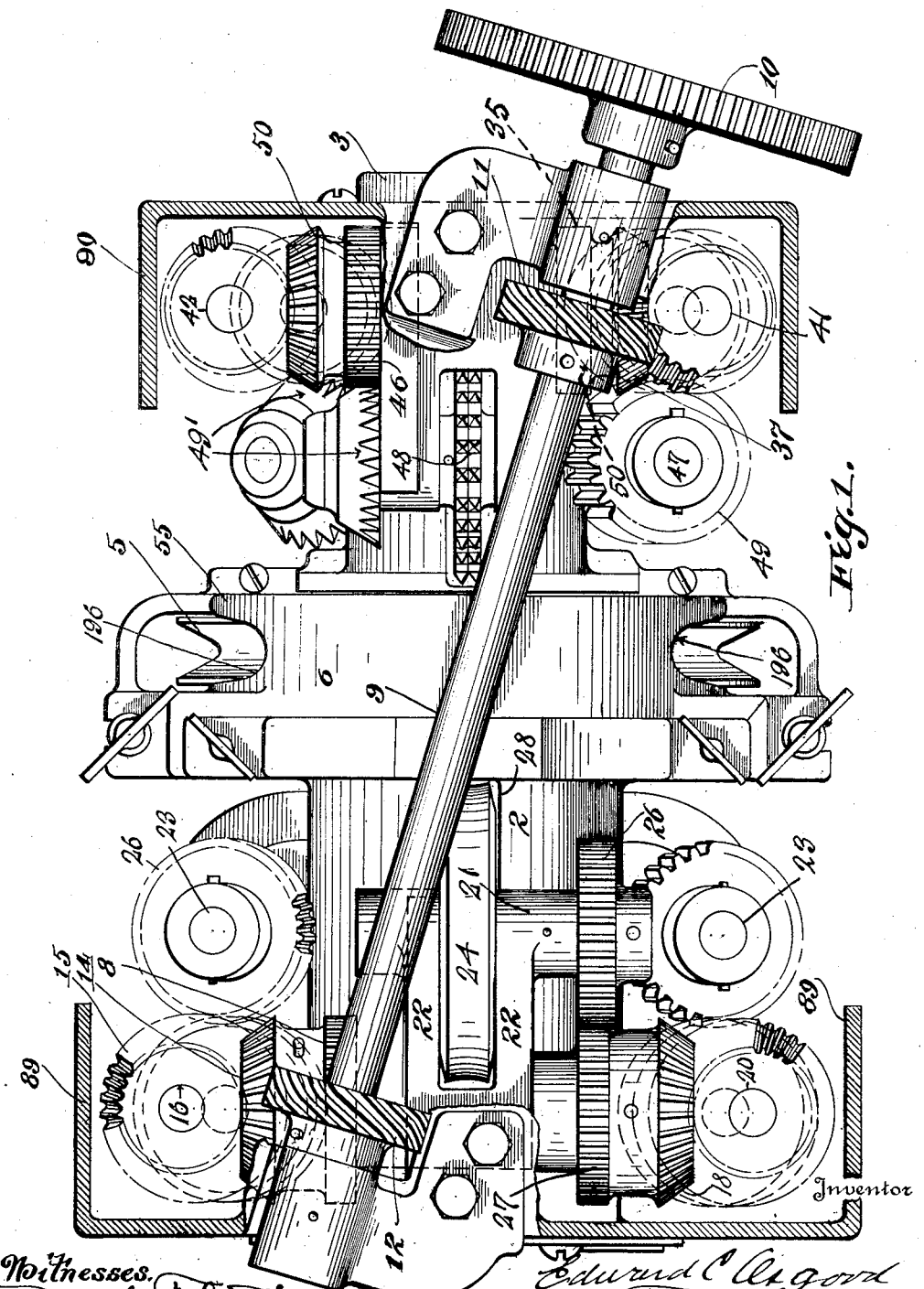
Fig. 1 is a top plan.

Referring to the drawings by numerals, the machine consists of a tubular member or frame 1 to and through which the ears of corn are fed for the cutting operation and on which are mounted the various moving parts. This tubular member will be referred to as consisting of a feeding member or tube 2 at the front end of the machine, a delivery tube 3, a central casing 4 for the cutting members, and a carrier or disk 5 on which the cutters are carried in their path of rotation. The casing 4 is split, a little above the center as indicated particularly in Figure 2, forming a removable cap 6. The tubes 2 and 3 are each formed with bearings for a set of feed actuating gears or the shafts thereof.

The feeding mechanism is driven from a feed and delivery shaft 9, shown as extending diagonally across the top of the machine, provided with a drive gear 10 at one end and carrying two spiral or helical gears 11, 12. The feed tube carries at one end a horizontal transverse shaft 7 driven by a spiral gear 8 meshing with a spiral gear 12 on the feed and delivery shaft 9. The shaft 7 also carries at one end a bevelled gear 14 meshing with a bevelled gear 15 secured to a shaft 16, also mounted on the feed tube, and shown as at or near 60° to the horizontal. At the opposite end of the shaft 7 is a second bevelled gear 18 meshing with a bevelled gear 19 secured to the shaft 20 also shown as mounted on the feed tube set at an angle of 60° to the horizontal, that is, the shafts 16 and 20 are symmetrical regarding the shaft 7 and the axis of the feed tube.

Each of the shafts 7, 16 and 20 carries pivotally mounted thereon a swinging arm or bracket 21, the axis about which the bracket swings being the axis of the corresponding shaft 7, 16 or 20. The shafts 7, 16 and 20 are near the mouth of the feed tube 2 and the brackets normally extend backward, i. e., in the direction of the feed and away from the mouth of the tube. Each bracket consists of a hub on the corresponding shaft 7, 16 or 20 and two arms 22 projecting as described in the direction of the feed and normally substantially parallel to the tube. Each arm has at its swinging end a bearing for a short stud or shaft 23 extending from one arm to the other of each bracket, parallel to the corresponding shaft 7, 16 or 20. On the stud 23 is mounted intermediately of the arms and bearings a feed roller 24 concave as to its periphery to fit the outer surfaces of the ears of corn and preferably made of rubber or suitable soft material as fabric to prevent injury to the corn. The roller is secured to the shaft as shown in Figure 7. On one end of each shaft 23, also secured thereto, is a spur gear 26 meshing with a spur gear 27 secured to the corresponding bevels 15, 18 or 19, see Figures 6 and 7. As each bracket 21 swings about the shaft 7, 16 or 20, meshing of the gears 26 and 27 is of course not interfered with and the feed rollers, whatever their position are driven constantly from the corresponding shafts 7, 16 and 20 which in turn are driven from the feed and delivery shaft 9. The feed rollers 24 work in and extend through slots 28 in the tube 2 and are controlled as to their position and pressed in contact with the moving ears of corn by means of plate springs 29.

The delivery tube 3 at the opposite end of the machine also includes supporting means for the delivery mechanism and this delivery mechanism in arrangement, manner of driving and so forth corresponds closely to the feeding mechanism, that is, there is a spiral or helical gear 35 on a horizontal shaft 36 supported in ears or brackets on the delivery tube which gear 35 meshes with the spiral gear 11 on the feed and delivery shaft, forming a driving connection from the feed and delivery shaft 9 to the shaft 36. The latter is provided with bevelled gears 37 and 38 secured to the shaft at each end and meshing with bevelled gears 39, 40 on the shafts 41, 42 respectively, each placed at an angle approaching 60° to the horizontal shaft 36. As shown, the bevel 37 is integral with the spiral 35.

Each of the shafts 36, 41 and 42 carries pivotally mounted thereon a swinging bracket 44 similar to the brackets 21, that is, there is a bracket 44 pivotally mounted on each of the shafts 36, 41 and 42, each bracket consisting of a hub 45 on the shaft and two arms 46 shown as extending forward, i. e., in a direction opposite to the feed and away from the delivery end of the tube. Mounted in the two arms of each bracket at the swinging end of the arms is a short shaft 47 on which shaft between the arms is a saw tooth feed wheel 48 rigidly secured to the shaft and on one end of each shaft is also rigidly secured a toothed gear 49' meshing with a toothed gear 50 secured to the corresponding bevels 38, 39 and 40. These saw tooth feed wheels 48 extend inward to the central passage of the tube 3, swinging into radial slots 51 therein. The brackets 44 swing about the axis of the corresponding shafts 36, 41 or 42 and preferably in the radial plane of the delivery tube 3. Therefore, the gears 49 and 50 remain always in mesh and their meshing is not affected by the swinging of the bracket. The feed wheels 48 are pressed against the cobs, i. e., pressed inward radially of the tube by means of springs 52 in each instance, acting on the swinging arms or brackets 44. The gears 49' serve exactly the same function and engage gears 50 in the same manner as the gears 49, but these gears are cut away as to their faces so that they have the frusto-conical shape illustrated. The purpose of this is foreign to the present machine and the invention. The contact surface is reduced, but as the load is small, this feature does not interfere with the efficient working of the machine.

Intermediate the feed tube 2 and the delivery tube 3 is the cutter casing 55 which, as shown, is made integral with both tubes. The exact construction is of course not an essential feature. The top half of the casing is preferably in the form of a removable cap 6 as already pointed out. The cutter casing 55 may be described as consisting of two compartments or sections, 56 being the cutter carrier chamber holding the cutter carrier or pulley 57, and 58 being the cutter chamber proper in which the cutters 59 carried by the carrier 57 revolve. The carrier 57 is mounted on a bearing 60 which is a tubular member set into the casing in alignment with the delivery tube or passage 3 and the feed tube or passage 2. This tubular member has an outer inclined or conical surface 61 at about 45° to the inner surface of the tube 2. Cooperating with the bearing member 60 is a bearing ring 62 having a 45° inclined circumferential surface 63. In assembling the bearings and so forth, the ring 62 is passed over the bearing member 60 and secured by a threaded ring or nut 64 engaging a thread on the bearing member. The ring 62 is held against rotation by pins 65 in the ring entering the slots 66 in the bearing member, shown as parallel to the axis of the tube. The carrier 57 is centrally apertured at 67 and in this aperture is a bearing ring 68 having bearing surfaces 69, 70 oppositely inclined at an angle of 45° to the axis of the tube. This bearing ring 68 is held in engagement with the disk or pulley by screws 71. The inclined bearing surfaces 61, 63 thus form a race for the balls 73 on which balls the cutter pulley takes its bearing, the inclined surfaces 69, 70 engaging the balls from within. The cutters are more fully and completely illustrated in Figure 3.

The cutters 59 are pivotally mounted on the face of the carrier 57, the pivots being screws 75 seated in the bearing rings 68 or in any convenient part of the pulley. The cutters are offset as shown, the blades 74 being cylindrically arranged. The blades are preferably cut on an angle as illustrated. The cutters are connected together to move simultaneously and uniformly by means of a rotatively sliding ring 76 mounted in the pulley 57 to which each cutter is connected by means of a pin 77 and a slot 78.

The cutters 59, see Figure 3, are each provided with a counter balancing portion 591 on the opposite side of the pivot 75 from the blade 74 so that in the rapid rotation of the cutter, the outward tendency of the blade portions 74 is to a large extent overcome or counter balanced by the outward tendency of the counter balance 591. This makes it possible to control the cutters by means of comparatively light springs 79, the centrifugal tendency being neutralized.

The ring 76 is controlled as to its angular position relatively to the pulley by a suitable spring or springs 79 in slots 80 in the carrier 57 pressing against pins 761 projecting from the ring 76 into the slots so that the cutters have an equal inward tendency, that is, the blades are pressed with equal force inward toward the cob. Also secured to the cutter pulley 57, I have wipers or scrapers 81, the same being radially placed and of outline to fit closely to the form of the casing except that each scraper blade, in the preferred form of the invention as shown, has an air pressure equalizing notch or cut way portion 82 at the outer corner or edge. As shown, these notches or cut away portions are on alternate edges of the blades so that the entire inner surface of the cutter chamber is scraped clean at each revolution of the pulley 57.

Referring now to the cross-section, Figure 9, it will be noted that the pulley 5 has a flange or rim 83 extending toward the cutter chamber and that, between the cutter chamber casing and the pulley chamber, the casing is provided with an internal or annular rim 84. The rim 84 has an inwardly disclosed frusto-conical surface 85 and the pulley has an outwardly disposed correspondingly conical surface 86 parallel to the surface 85 and spaced therefrom but a very small fraction of an inch and these surfaces are inclined inwardly from the circumference of the cutter chamber toward the axis of the feed and delivery tubes and the cutter chamber. As in the rapid rotation of the cutters, a strong centrifugal tendency is imparted to the liquid as well as the solid particles and the aperture between these surfaces 85 and 86 leads inward toward the center from the cutter chamber rather than outward, it is apparent that the centrifugal action will tend to clear this aperture throwing any material which may enter it in the direction of the cutter chamber thus preventing escape of the cut material therethrough.

It will be noted that the bearing member 60 is held in place in the casing by means of the bearing ring 62 which is shown as substantially triangular in cross-section having its peripheral edge 87 seated in and closely fitted to a corresponding annular groove 88 in the casing and cap in which it is locked by the friction of the parts.

The gears at the feed end are protected by a removable gear cover 89 and the corresponding gears at the delivery end are protected by a corresponding removable gear cover 90. Leading out from the cutter chamber 58 is a peripheral delivery passage 91 for the cut corn. As shown, the side 92 of this passage which is first reached by the cutters in normal revolution, is tangent to the wall of the casing extending forward in the direction of motion of the cutters, and the opposite wall 93 of the passage is parallel to the wall 92.

In operation, corn in the milk is fed to the machine through the mouth of the feed tube 2. As the ears are thrust in at the opening, being fed by any obvious and suitable feed mechanism, as the V-shaped trough 95 with the chain 96, they are engaged, each ear in turn, by the rollers 24 which swinging on their brackets 21 about the corresponding shafts 7, 16 and 20, are pressed against the exposed surfaces of the soft grain with a predetermined degree of pressure sufficient to hold them and feed them forward to the cutters without breaking the skin or injuring the kernels as to their form and appearance. The feed rollers, as already stated, may be armed as to their periphery with rubber, fiber or any suitable material. The cutters mounted on the rapidly rotating pulley 57 are thrust forward with their cutting edges on a tangent to the cob and pressed inward by the action of the springs 79 on the rotating ring 76 to which the cutters are all connected by the pivot and slot engagement already pointed out. This arrangement of the cutters results in a clean severance of the grain from the cob without removing any of the hard, woody, fibrous material which would be objectionable if mixed with the grain. In this way a great saving is effected even as compared to hand-cutting, and the product is clean and whole as distinguished from that of the previous corn-cutting or corn mush machines. The ears are guided to and through the cutters by converging spring arms 200 which project inward from the mouth of the feed tube, each being in a radial plane of the tube. The springs are three in number, one between each two rollers, and while they converge inward from the mouth of the tube, they may be termed in a general way parallel to the axis of the tube; more properly they converge toward this axis.

Rotation of the pulley or carrier 57 which is driven by any suitable means as a belt 195 passing through openings 196 in the casing, is rapid and as the casing has the shape of a blower casing, an efficient blower action results. This action is greatly enhanced and the cleansing of the apparatus most efficiently completed by the scrapers 81 which fit the casing except for the peripheral notches in the scrapers which are alternately placed so that the entire inner surface of the casing is scraped at each revolution. These scrapers with the other rotating members in the cutter casing also have a most efficient fan action and the central feed with the peripheral discharge of the cut grain through the passage 91 is accompanied by sufficient draft to prevent, particularly when assisted by the action of the scrapers, the accumulation of any fermentable debris, as milk, pulp and the like, with consequent injury to the product by quick fermentation as already pointed out.

From the cutters, the cobs pass through the hollow or tubular bearing member 60 to the delivery tube 3 where they are engaged by the three delivery rollers 48, the destruction of the cobs or indentation of their surfaces being of course at this time immaterial. The grip of the rollers 48 is spaced from the grip of the rollers 24 by a distance considerably less than the length of the shortest cob so that the end of each cob is seized by these rollers before it is released by the rollers 24 and hence before cutting is complete. If the delivery rollers should not take hold before the feed rollers loose the hold on the cob, the next ear fed forward pushes the previous one thus released. The gear ratio is such that the peripheral speed of both sets of rollers is the same, the cobs being thus advanced through the machine at a uniform speed corresponding to the speed of the cutters. Mounting of the rollers on the brackets 21 and 46 which swing, each in a radial plane of the axis of the feed and delivery tubes, about the corresponding shafts 7, 16 and 20, and 36, 42 and 44, and about the centers of the gears 27, 49, from which they are driven, not only results in a constant drive of these rollers at a uniform speed ratio in whatever position they may occupy, but makes it possible for them to move outward to conform to the ears and cobs and inward in response to the springs so that they grip the cob or ear however small its diameter and engage each with a practically uniform degree of tension, operating in a similar manner on all. The iris diaphragm arrangement of the cutters is similar in that the cutting operation takes place with equal efficiency on cobs of all diameters and dimensions, the cutters moving out and in to conform to the diameter of the cob. The cutters are always given an inward tendency but they yield outward in response to the pressure of the cob or ear, adjusting themselves in each instance to the size of the ear.

Figures 10, 11 and 12 illustrate a modified form in which all moving parts are geared to a single shaft; otherwise, the machine is as illustrated in the views just described. In the form shown in Figures 10, 11 and 12 there is a drive-shaft 210 with fast and loose pulleys 211 and 212. This shaft carries spiral gears 213 and 214. The latter meshes with a spiral gear 216 driving a train of gears, which, except for the position of the driving spiral gear corresponding to the gear 8 in Figure 6, is exactly like the train of gears illustrated in Figure 6 driving the feed rollers 24. Spiral gear 213 drives a train of gears corresponding to that illustrated in Figure 5, actuating the delivery rollers or wheels 51, the spiral gear 217, with which the spiral gear 213 meshes, corresponding to the gear 35 in the train shown in Figure 8 except that it is on one of the lower shafts. The cutter-carrier or pulley, corresponding to the pulley 57 in the first form of the invention, indicated by reference character 218, see Figure 11, is, in this instance, provided with peripheral gear teeth 219 meshing with the pinion 220 on the shaft 210, so that in the form shown in Figures 10, 11 and 12, the drive is from a single source.

The external feed of the material has been illustrated in Figure 12, as already pointed out, the shaft 210 carrying a worm 221 meshing with a worm-gear 222 which carries a toothed gear 223 meshing with a gear 224 on the shaft 225, carrying a sprocket 226 which drives the chain 96 in the trough 95. The operation of the form illustrated in Figures 10, 11 and 12 is precisely the same, except as to choice of gears, as the form previously described.

Having further reference to Figures 2 and 12, I have illustrated in that figure a table 250 having the general characteristics of the table intended to be used with any and all these corn-cutting machines, whether of the type illustrated in Figure 12, or of the type shown in the preceding figures, the idea being that the table underlies the entire mechanism serving to catch such debris as may be thrown off. To this end, it is preferably provided with upright sides 251, the only opening through the table being the opening 252 in which the end of the delivery passage 91 is inserted. A suitable receptacle for the cut corn is placed beneath the delivery passage 91 and the table prevents the mixing of the product from the delivery opening with the debris which may drop from other parts of the machine. As has already been pointed out, all material discharged from the delivery opening is fresh and unmixed with fermented debris, all the surfaces of the machine with which this product comes in contact being kept clean by the scrapers and the fan action. These surfaces are, as already pointed out, encased and protected from the debris which in all corn-cutting machines collects on the outside of the frame, on the gears and so forth, forming a mass of fermenting material which in the majority of machines is permitted to be mixed with the product, one of the important features of this machine being that no such mixture takes place; the product is fresh and unmixed with fermented material and therefore keeps without fermenting until it can be put into the cans.

I have thus described my invention specifically and in detail in order that its nature and operation may be fully understood; however, the specific terms herein are used descriptively rather than in their limiting sense and the scope of the invention is defined in the claims:

1. In a machine for cutting green corn from the cob, a rapidly rotating cutter, a casing having an opening on one side to receive the ears and on the other side to discharge the cob, the path of the cutter being concentric with said openings, and a peripheral discharge so that the casing and cutters have the effect of a centrifugal air pump or blower, the air draft serving to clear the debris and milk from the casing and discharge it with the cut kernels, thereby preventing fermentation in the machine.

2. In a machine for cutting green corn from the cob, a rapidly rotating cutter, a casing having an opening on one side to receive the ears and an opening on the other side to discharge the cob, a scraper moving with the cutter and conforming in a general way to the cross-section of the casing taken on a plane of the axis, the path of the scrapers being concentric with said openings, and a peripheral discharge so that the casing and scrapers have the effect of a centrifugal air pump or blower, the air draft serving to clear the debris and milk from the casing and discharge it with the cut kernels, thereby preventing fermentation in the machine.

3. In a machine for cutting green corn from the cob, a rapidly rotating cutter, a casing having an opening on one side to receive the ears and on the other side to discharge the cob, the path of the cutters being concentric with said openings, and a tangentially disposed peripheral opening leading forward and outward from the path of the cutter in the direction of rotation in the normal cutting operation, so that the casing and cutter have the effect of a centrifugal air pump or blower, the air draft serving to clear the debris and milk from the casing and discharge it with the cut kernels, thereby preventing fermentation in the machine.

4. In a machine for cutting green corn from the cob, a rapidly rotating cutter, a casing having a horizontal opening on one side to receive the ears and on the other side to discharge the cob, a scraper or fan moving with the cutter and conforming in a general way to the cross-section of the casing taken on a plane of the axis, the path of the cutter being concentric with said openings, and a tangentially disposed peripheral opening leading forward and outward from the path of the cutters in the direction of rotation in the normal cutting operation, so that the casing and cutter have the effect of a centrifugal air pump or blower, the air draft and scraping action serving to clear the debris and milk from the casing and discharge it with the cut kernels, thereby preventing fermentation in the machine.

5. In a machine for cutting corn, a casing having concentric inlet and discharge passages, a rotating cutter on the same axis, having a bearing in said casing, the same having a central opening concentric with the passages and casing, said opening and passages being horizontal, a carrier mounted to rotate on said bearing and means for driving the same, cutters on said carrier rotating therewith and mounted to move relatively to the carrier on a path in which they approach and recede from the center, yielding means tending to move them simultaneously inward toward the center, and scrapers on the carrier between the cutters, the same being of cross-section similar to the corresponding cross-section of the casing, the scrapers being notched near the periphery, the notches being alternately placed so that the scrapers clean the casing at each revolution, the same having a peripheral opening for the discharge of corn with the result that the rotating members in the casing, the latter having a central intake and peripheral discharge, have the operation of a centrifugal air pump or blower collecting the fine particles and milk and forcing them out with the discharged grain preventing the accumulation of fermentable material in the casing with the consequent loss of the cut grain by quick fermentation.

6. In a machine for cutting green corn from the cob, a rotating apertured carrier, cutters mounted thereon to swing toward and from the center of the aperture, a member mounted on the carrier to move on a path substantially concentric with the axis of the carrier, the cutters being each connected to the moving member, the movement of said member on its path in one direction causing the cutters to approach, and in the other direction to recede from the axis of the carrier, means imparting a tendency to said moving member to swing the cutters toward the axis of the carrier and a counter balance for each cutter tending to overcome the outward tendency of the cutter due to the rotation of the carrier.

7. In a machine for cutting green corn from the cob, an apertured rotating cutter carrier and means for driving the same, cutters on the carrier mounted to swing relatively thereto on a path approaching and receding from the center, a ring mounted on the carrier to oscillate relatively thereto, a pin and slot connection between the cutters and the ring and a spring tending to rotate the ring and move the cutters toward the center, and a weight for counter balancing each carrier.

8. In a machine for cutting green corn from the cob, a rotating cutter carrier, means for driving the same, cutters on the carrier mounted to swing relatively thereto on a path approaching and receding from the center, a casing enclosing the cutters and cutter carrier, the same having a peripheral discharge opening and a central feed opening for the ears and a delivery opening for the cobs, a feed tube connected to the casing at the feed opening, a delivery tube connected to the casing at the delivery opening, each tube having longitudinal slots spaced about its periphery, feed rollers in the slots of the feed tube, delivery rollers in the slots of the delivery tube, a radially swinging arm carrying each said roller, a pivotal stud or shaft for each said swinging arm, a toothed gear on each said shaft, a toothed gear on each feed and delivery roller driven from the gear on the corresponding shaft, and means for driving the gears on each said pivotal stud or shaft.

9. In a machine for cutting green corn from the cob, a rotating cutter carrier having a central aperture, means for driving the same, cutters on the carrier mounted to swing relatively thereto on a path approaching and receding from the center, means mounted on the carrier to oscillate relatively thereto, a pin and slot connection between the cutters and the oscillating means, a spring tending to swing the oscillating means and move the cutters toward the center, and a casing enclosing the cutters and cutter carrier, the same having a peripheral discharge opening and a central feed opening for the ears and delivery opening for the cobs, the cutter carrier having scrapers to fit the casing, the scrapers having a fan action.

10. In a machine for cutting green corn from the cob, a rotating cutter carrier the axis of rotation being horizontal, cutters thereon, means causing the same to conform to the size of the cob, a cutter casing having a horizontal aperture in alignment with the cutters for the admission of the ear of corn, and a peripheral discharge opening and means for feeding the cobs and preventing rotation thereof.

11. In a machine for cutting green corn from the cob, a rotating cutter carrier, the axis of rotation being horizontal, cutters thereon, means causing the same to conform to the size of the cob, scraper members on the carrier, a cutter casing having a horizontal aperture in alignment with the cutters for the admission of the ear of corn, and a peripheral discharge opening.

12. In a machine for cutting green corn from the cob, a rotating cutter carrier, cutters thereon, means causing the same to conform to the size of the cob, scraper members on the carrier, a cutter casing having an aperture in alignment with the cutters for the admission of the ear of corn, and a tangential peripheral discharge opening.

13. In a machine for cutting green corn from the cob, a rotating cutter carrier, cutters pivotally mounted thereon, a sliding ring mounted on the cutter carrier, a spring tending to rotate said ring in a direction opposite to the direction of rotation of the carrier, the cutters extending outward beyond the pivot and having a pin and slot connection with the ring.

14. In a machine for cutting corn from the cob, a rotating cutter carrier having a horizontal aperture, cutters arranged around the aperture having blades substantially parallel to the axis, means tending to move said blades inward toward the center of the carrier, a closed casing having a peripheral delivery opening for the cut corn enclosing the carrier and cutters, means for feeding the ears to the central aperture of the carrier, means enclosing the cutting members and means for scraping the enclosing means internally.

15. In a machine for cutting corn from the cob, a rotating cutter carrier having a horizontal aperture, cutters arranged around the aperture having blades substantially parallel to the axis, means tending to move said blades inward toward the center of the carrier, a closed casing having a peripheral delivery opening for the cut corn enclosing the carrier and cutters, means for feeding the ears to the central aperture of the carrier, and scrapers mounted on the carrier, each having an outline to conform substantially to the casing.

16. In a machine for cutting corn from the cob, a rotating cutter carrier having a central aperture, cutters arranged around the aperture having blades substantially parallel to the axis, means tending to move said blades inward toward the center of the carrier, a closed casing having a peripheral delivery opening for the cut corn enclosing the carrier and cutters, means for feeding the ears to the central aperture of the carrier, and scrapers mounted on the carrier, each having an outline to conform substantially to the casing, the scrapers serving to clean the materials from the walls of the casing and also having a fan action.

17. In a machine for cutting corn from the cob, a rotating cutter carrier having a central aperture with cutters mounted around the aperture and mounted to move toward and from the center, a casing having a peripheral discharge aperture enclosing the cutter carrier and cutters, the machine having a feed passage connected to the cutter casing at one side and a delivery passage connected to the cutter casing at the opposite side, feed rollers mounted on the feed passage, the latter being slotted to receive the rollers, and means for causing the rollers to press inward toward the center of the passage, the delivery passage being likewise slotted and having delivery rollers mounted to swing through the slots.

18. In a machine for cutting corn, a rotating cutter carrier having a horizontal axis and a central aperture, cutters mounted around the aperture, a blower-like casing enclosing the cutters and carrier, the casing having a peripheral delivery opening for the corn, and an inlet and discharge tube in alignment with the central aperture, the tubes being slotted and having radially placed feed and delivery rollers respectively mounted in the slots with means for rotating the same.

19. In a machine for cutting green corn from the cob, a rotary cutter, a casing enclosing the cutter and having a lateral discharge opening for the product, a receptacle beneath the opening and means for catching the debris to keep it from entering the receptacle, said means having an opening registering with the discharge opening to permit the passage of the product into the receptacle.

20. In a machine for cutting green corn from the cob, a rotating cutter, a casing having an opening on one side to receive the ears and on the other side to discharge the cob, means for feeding the ears and discharging the cobs, the casing having a discharge opening, and a table beneath the machine to catch the debris and fermented material dropping from the machine, the table having an opening to register with the discharge opening so that a receptacle may be placed beneath the discharge opening to catch the product, the same being sheltered by the table from the dropping of debris from the machine.

21. In a machine for cutting green corn from the cob, a rotating cutter carrier, cutters thereon, means causing the same to conform to the size of the cob, a cutter casing having an aperture in alignment with the cutters for the admission of the ear of corn, a peripheral discharge opening, and a table underlying the machine to catch the debris, the table having an opening to register with the discharge opening.

22. In a machine for cutting green corn from the cob, a rotating cutter carrier, cutters thereon, means causing the same to conform to the size of the cob, air pumping scraper members on the carrier, a cutter casing having an aperture in alignment with the cutters for the admission of the ear of corn, and a peripheral discharge opening.

23. A machine for cutting green corn from the cob, having a blower-like casing and rotating fan-like members, the casing having a peripheral discharge whereby an air draft is set up, serving to clear the debris and milk from the machine and discharge it with the cut kernels.

24. In a machine for cutting green corn, a closed casing, means for feeding the ears through the casing; means for cutting corn from the cob, means for setting up an air draft through the machine to clear the debris and milk from the casing and discharge it with the cut kernels, thereby preventing fermentation in the casing.

25. A machine for cutting green corn from the cob, having a rotating cutter, a horizontal shaft for the same, a blower-like casing with its axis horizontal and an opening on one side to discharge the cut corn and scraping means on the shaft contacting the walls of the casing, the said scraping means serving to set up an air draft, which tends to clear the debris and milk from the casing and discharge it with the cut kernels.

26. In a machine for cutting green corn from the cob, a casing, feeding means for engaging the cobs and feeding them through the machine and means for driving said feeding means, cutters for severing corn from the cob and means for driving the cutters, the feeding means and cutters engaging the corn and cob within the casing and the driving means being outside the casing.

27. In a machine for cutting corn from the cob, a casing having a passage therethrough for the cobs and ears, feeding means projecting into the casing to engage the cobs and ears, means outside the casing for driving the feeding means, cutters within the casing and means outside the casing for driving the cutters, so that the driving mechanism is protected from the debris.

28. In a machine for cutting corn from the cob, a rotating cutter carrier and cutting elements pivotally mounted thereon to swing toward and from the center of rotation, each cutting element having a counter balance to overcome the centrifugal tendency of the cutter.

29. In a machine for cutting corn from the cob, a rotating cutter carrier, cutters pivotally mounted thereon and counter balancing means placing said cutters approximately in centrifugal balance.

30. In a machine for cutting corn from the cob, a casing having a passage therethrough for the ears and the cobs, feeding means projecting through the casing into contact with the ears and cobs, driving means for said feeding means outside of the casing, cutting means inside the casing and driving means therefor outside the casing.

Signed by me at Baltimore, Md., this 23 day of January, 1918.

EDWARD C. OSGOOD.

Witnesses:
ZELLA KUHN,
PORTER H. FLAUTT.